United States Patent
Turner et al.

(10) Patent No.: US 11,092,092 B2
(45) Date of Patent: Aug. 17, 2021

(54) OPERATING A COMPRESSION IGNITION ENGINE FUELLED WITH A COMBINATION OF A HYDROCARBON FUEL AND HYDROGEN

(71) Applicant: ULEMCO LTD, Aintree (GB)

(72) Inventors: Paul Turner, Brentwood (GB); Trevor Jasper, Brentwood (GB)

(73) Assignee: ULEMCO LTD, Aintree (GB)

( * ) Notice: Subject to any disclaimer, the term of this patent is extended or adjusted under 35 U.S.C. 154(b) by 0 days.

(21) Appl. No.: 16/963,216

(22) PCT Filed: Jan. 18, 2019

(86) PCT No.: PCT/GB2019/050136
§ 371 (c)(1),
(2) Date: Jul. 18, 2020

(87) PCT Pub. No.: WO2019/145683
PCT Pub. Date: Aug. 1, 2019

(65) Prior Publication Data
US 2021/0131361 A1    May 6, 2021

(30) Foreign Application Priority Data
Jan. 23, 2018    (GB) ...................... 1801078

(51) Int. Cl.
*F02D 19/10*    (2006.01)
*F02D 19/06*    (2006.01)
(Continued)

(52) U.S. Cl.
CPC ....... *F02D 19/105* (2013.01); *F02D 19/0615* (2013.01); *F02D 19/081* (2013.01);
(Continued)

(58) Field of Classification Search
CPC .............. F02D 41/0025; F02D 19/081; F02D 19/0647; F02D 19/084; F02D 19/08; F02D 19/087
(Continued)

(56) References Cited

U.S. PATENT DOCUMENTS

2010/0229838 A1* 9/2010 Sturman ............... F01L 1/28
123/525
2014/0309909 A1* 10/2014 McMahon ............ F02D 19/061
701/103
(Continued)

FOREIGN PATENT DOCUMENTS

| CA | 2524146 A1 | 12/2006 |
|---|---|---|
| EP | 1975394 A2 | 1/2008 |
| WO | 2013150729 A1 | 10/2013 |

OTHER PUBLICATIONS

UK Intellectual Property Office, search report for British Application No. GB1801078.5, dated Aug. 1, 2018, pp. 1-5.
(Continued)

*Primary Examiner* — Sizo B Vilakazi
(74) *Attorney, Agent, or Firm* — Cahn & Samuels, LLP

(57) ABSTRACT

The invention concerns a method of operating a compression ignition engine (10) fuelled with a combination of a hydrocarbon fuel and hydrogen. The method comprises: during a cold start, fuelling the engine with the hydrocarbon fuel alone, or with the hydrocarbon fuel and a reduced proportion of hydrogen compared with warm running conditions, and increasing the proportion of hydrogen used to fuel the engine as it warms up whilst running.

14 Claims, 1 Drawing Sheet

(51) Int. Cl.
*F02D 19/08* (2006.01)
*F02D 41/00* (2006.01)
*F02D 41/06* (2006.01)
*F02P 19/02* (2006.01)

(52) U.S. Cl.
CPC ....... *F02D 41/0027* (2013.01); *F02D 41/064* (2013.01); *F02P 19/02* (2013.01); *F02D 2200/021* (2013.01)

(58) Field of Classification Search
USPC ................................ 123/575, 576, 577, 578
See application file for complete search history.

(56) References Cited

U.S. PATENT DOCUMENTS

| 2017/0022882 A1* | 1/2017 | Sturman | F02B 7/08 |
| 2017/0114730 A1* | 4/2017 | Laget | F02D 41/0025 |
| 2019/0017448 A1* | 1/2019 | Monros | F02D 19/081 |

OTHER PUBLICATIONS

European Patent Office, International Search Report for PCT Application No. PCT/GB2019/050136, dated Mar. 27, 2019, pp. 1-4.
European Patent Office, Written Opinion for PCT Application No. PCT/GB2019/050136, dated Mar. 27, 2019, pp. 1-8.

* cited by examiner

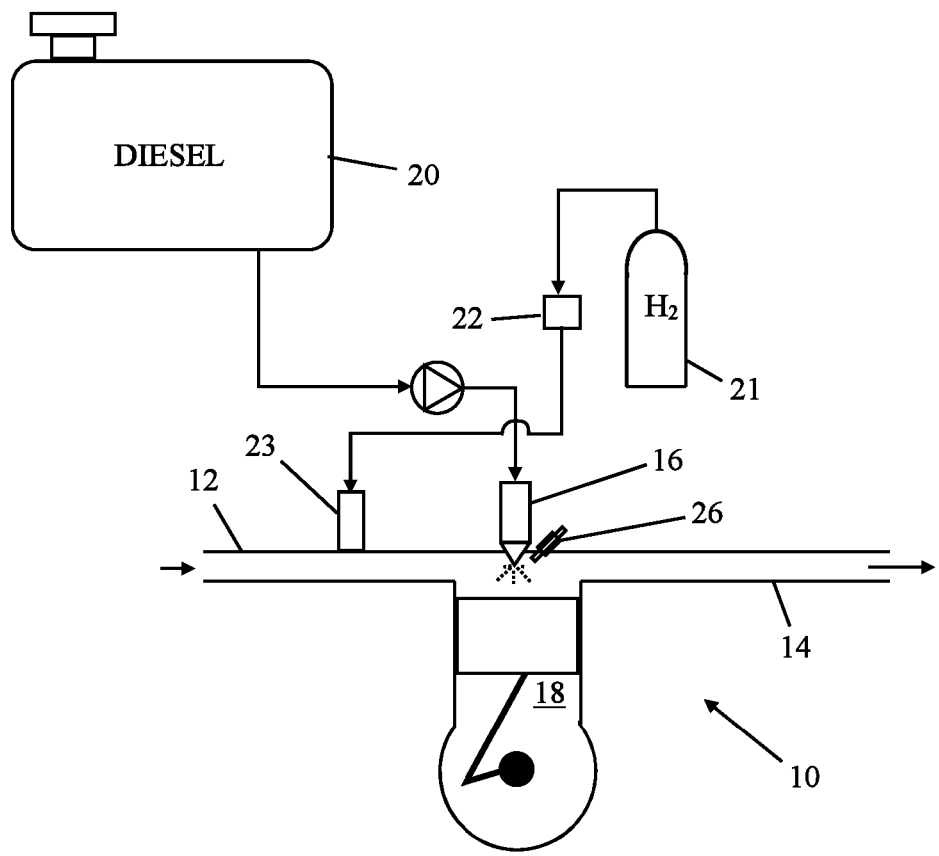

OPERATING A COMPRESSION IGNITION ENGINE FUELLED WITH A COMBINATION OF A HYDROCARBON FUEL AND HYDROGEN

The invention addresses problems encountered during cold running of an engine fuelled on a mixture of a hydrocarbon fuel and hydrogen.

There are powerful economic and societal incentives to reduce the consumption of hydrocarbon based fuels in internal combustion engines. Release of carbon by their combustion is thought to be a major contributor to global warming. The Earth's resources of crude oil are finite, and its extraction harms the environment in various ways.

Hydrogen has long been suggested as a substitute for hydrocarbon based fuels and the modern focus on reduction of carbon release into the atmosphere has only increased its attraction in this respect. But for a range of technical and social reasons widespread adoption of hydrogen fuelling of vehicles has not taken place at the time of writing.

It is known to fuel internal combustion engines on a controlled mixture of hydrogen and a hydrocarbon fuel. In some instances hydrogen is used in a small proportion for the control of noxious emissions in the engine's exhaust. In others, a much larger proportion of hydrogen is used in order to substantially reduce consumption of the hydrocarbon fuel.

This dual fuelling approach has numerous potential advantages. It is possible to adapt existing internal combustion engines, especially compression ignition engines conventionally fuelled on diesel, to use a hydrogen/hydrocarbon mixture. Hydrogen alone cannot be used to fuel a diesel engine as it does not undergo compression ignition. The diesel component provides the required compression ignition characteristics and serves to ignite the hydrogen. Consumption of diesel can nonetheless be greatly decreased. Hydrogen gives low energy density per unit volume, so that engines fuelled on hydrogen alone provide low maximum power in relation to their swept volume. But in a dual fuelled hydrogen/diesel engine the mixture can be adjusted according to power demand. The proportion of hydrogen used can be maximised while the power demanded of the engine is modest, and when high power is demanded the proportion of diesel can be increased, so that performance need not suffer. The engine can typically be run on diesel alone when required, so that the vehicle is not dependent on frequent access to a hydrogen source (which would at present be problematic since refuelling stations capable of supplying hydrogen are not uniformly available).

In the process of development of a dual fuelled hydrogen/diesel engine, the inventors encountered a practical problem relating to cold engine running. It was found, surprisingly, that when the engine was cold, in the period immediately following start-up, the addition of hydrogen to the fuel caused the engine to stall. This was initially a puzzling finding as hydrogen has a low ignition energy and it might be thought that its addition to the mixture would therefore promote fuel ignition.

According to the present invention there is a method of operating a compression ignition engine fuelled with a combination of a hydrocarbon fuel and hydrogen, the method comprising:

- during a cold start, fuelling the engine with the hydrocarbon fuel alone, or with the hydrocarbon fuel and a reduced proportion of hydrogen compared with warm running conditions, and
- increasing the proportion of hydrogen used to fuel the engine as it warms up whilst running.

A specific embodiment of the present invention will now be described, by way of example only, with reference to the accompanying drawing, which is a schematic representation of parts of an engine operable in accordance with the invention.

The embodiment of the invention described herein is implemented in a compression ignition internal combustion engine, and specifically a diesel engine 10 represented in highly schematic form in the drawing, having an air intake manifold 12, an exhaust 14, and a set of fuel injectors 16 associated with respective combustion chambers 18, only one of which is seen in the drawings. Diesel fuel is drawn from a tank 20 and supplied to the injectors 16. Hydrogen is stored in pressure vessel 21 in liquid or gaseous form and at high pressure (which purely by way of example may be in the range of 35 to 70 MPa), and is supplied to the engine's air intake manifold via a regulator unit 22 used to regulate the pressure of hydrogen supplied. Hydrogen injector 23 delivers the hydrogen and diesel fuel for ignition is supplied through injector 16.

Operation of the engine is under the control of an electronic processing system represented in the drawing as an ECU (electronic control unit) 24. Control connections from the ECU 24 are not represented in the drawings for the sake of simplicity, but the ECU serves, in response to input data from a range of sensors, to control among other items:

- the regulator unit 22 and the hydrogen injector 23, and through it the quantity of hydrogen supplied to the combustion chambers 18;
- the fuel injectors 16, and through them the quantity of diesel supplied to the combustion chambers 18; and
- glow plugs 26 associated with the combustion chambers 18.

The ECU regulates diesel and hydrogen supply to achieve (a) a desired input of fuel energy to the engine, which varies according to factors including the driver's power demand, and (b) a desired balance between diesel and hydrogen fuelling.

The glow plugs 26 facilitate starting of the engine when the engine is cold, as is well known in relation to conventional diesel engines. Hydrogen is not injected whilst the glow plugs are active because the glow plugs would ignite the hydrogen prematurely, even in the absence of compression by the engine pistons, with a risk of flash-back in the intake manifold. So one possible process for a cold start is to activate the glow plugs and fuel the engine with diesel only during start-up, then deactivate the glow plugs and begin supply of hydrogen with the diesel.

However in practical trials of engines of the illustrated type, the inventors have found that when following this process the addition of hydrogen to the fuel mix under causes the engine to stall. This originally came as a great surprise, since hydrogen is easily ignitable and might be expected to assist cold running.

In seeking an explanation and solution, numerical simulations were used to explore the heat distribution in the combustion chamber. It is not intended to limit the scope of the present invention by reference to any theoretical explanation, and the efficacy of the invention has been confirmed by practical trials. But there is a working hypothesis that the hydrogen tends to quench combustion because it has high thermal conductivity. In the period after start-up, the engine block is relatively cold. It provides a thermal reservoir able to receive heat from the combustion chamber. The hydrogen, because of its thermal conductivity, provides a route for heat to flow from the combustion zone through the walls of the combustion chamber to the engine block, and so causes temperatures in the combustion zone to be depressed. It is the diesel that undergoes compression ignition and causes the fuel mixture as a whole to ignite. If the diesel does not reach the necessary temperature, ignition is quenched, despite the low ignition energy of the hydrogen.

The problem is not encountered during normal running conditions, when the engine block has been heated by the combustion of fuel, since the temperature difference between the engine block and the combustion zone is then greatly diminished and conduction of heat from the combustion zone by the hydrogen correspondingly reduced.

Whilst the problem could therefore be solved by fuelling the engine on diesel alone until the engine has reached its normal running temperature, this is not an attractive solution since it would increase diesel consumption and reduce the benefits of dual fuelling, especially where a vehicle is used for short journeys, which might prove to be fuelled wholly or largely by diesel.

The ECU is programmed to control start-up and fuelling in the following manner.

At start-up, the engine is fuelled on diesel alone. If the engine is equipped with glow plugs 26 and the conditions require it, the glow plugs may be activated. Diesel-only fuelling continues until a measured engine temperature reaches a threshold value. In the present embodiment the ECU receives a signal from a sensor responsive to engine coolant temperature, and the threshold value is a value of sensed coolant temperature. The threshold temperature is well below a normal operating temperature.

When the measured engine temperature reaches the threshold value, the glow plugs are deactivated. A delay is implemented before supply of hydrogen commences. The delay may be specified as a chosen number of engine cycles.

After the delay, supply of hydrogen commences. This happens before the engine has reached its warm running temperature. To avoid quenching combustion, the proportion of hydrogen to diesel is reduced at this point, compared to the proportion that would be supplied in accordance with the ECU's warm-running control strategy.

The proportion of hydrogen is then increased progressively as the engine warms up. More specifically, the ECU counts engine cycles, and increases the proportion of hydrogen as a function of the number of engine cycles since commencement of hydrogen supply. This is found to be more effective than increasing the proportion of hydrogen as a function of measured coolant temperature since coolant temperature is not necessarily a good indicator of temperature in the engine block and especially in the engine's combustion zones. It would nonetheless be possible to increase the proportion of hydrogen as a function of a sensed engine temperature, or to take account of other factors such as engine fuelling in the calculation.

The engine in question here is to be fuelled on a high proportion of hydrogen. The energy contribution of the hydrogen is typically in the region of 70-95% when warm running conditions are reached, and whilst power demand is moderate. As mentioned above, a larger proportion of diesel can be used to satisfy a driver demand for high power.

The invention claimed is:

1. A method of operating a compression ignition engine fuelled with a combination of a hydrocarbon fuel and hydrogen and having at least one combustion chamber provided with a glow plug, the method comprising,
during a cold start:
activating the glow plug;
fuelling the engine with the hydrocarbon fuel alone whilst starting;
deactivating the glow plug when a sensed engine temperature reaches a predetermined threshold value which is below a normal engine operating temperature;
after deactivation of the glow plug, implementing a delay prior to commencement of hydrogen supply to the engine, during which the engine continues to be fueled with the hydrocarbon alone;
after the delay, commencing hydrogen supply to the engine; and
progressively increasing the proportion of hydrogen to the hydrocarbon fuel over time as the engine warms up whilst running.

2. The method as claimed in claim 1, wherein the supply of hydrogen commences after a second threshold value of a sensed engine temperature is reached.

3. The method as claimed in claim 2, wherein the second threshold value of the sensed engine temperature is less than 60% of a warm running temperature.

4. The method as claimed in claim 3, wherein the sensed engine temperature is an engine coolant temperature.

5. The method as claimed in claim 2, wherein after commencement of hydrogen supply, the proportion of hydrogen in the fuel is increased as a function of engine cycles since commencement.

6. The method as claimed in claim 1, wherein during warm running, hydrogen makes up at least 65% of the fuel's energy content for at least some of the time.

7. The method as claimed in claim 1, wherein the hydrocarbon fuel is diesel.

8. An electronic control unit for an engine programmed to implement the method as claimed in claim 1.

9. A computer program product embodied on a computer readable storage medium to cause the engine controller to operate the engine in accordance with claim 1.

10. A compression ignition internal combustion engine comprising at least one injector for supply of a hydrocarbon fuel to at least one combustion chamber and a hydrogen supply for supplying a controlled quantity of hydrogen to an air intake leading to the combustion chamber, the engine having an electronic controller configured to implement a cold start up process comprising:
activating the glow plug;
fueling the engine with the hydrocarbon fuel alone whilst starting;
deactivating the glow plug when a sensed engine temperature reaches a predetermined threshold value which is below a normal engine operating temperature;
after deactivation of the glow plug, implementing a delay prior to commencement of hydrogen supply to the engine, during which the engine continues to be fueled with the hydrocarbon fuel alone;
after the delay, commencing hydrogen supply to the engine; and
progressively increasing the proportion of hydrogen to the hydrocarbon fuel over time as the engine warms up whilst running.

11. The engine as claimed in claim 10, wherein the engine is fuelled with the hydrocarbon alone during a cold start, and in which the supply of hydrogen commences after a threshold value of a sensed engine temperature is reached.

12. The engine as claimed in claim 11, wherein the threshold value of the sensed engine temperature is less than 60% of a warm running temperature.

13. The engine as claimed in claim 11, wherein after commencement of hydrogen supply, the proportion of hydrogen in the fuel is increased as a function of engine cycles since commencement.

14. The engine as claimed in claim 11, wherein the electronic controller being configured to cause the glow plug to be activated during engine start-up and deactivated prior to commencement of hydrogen supply.

* * * * *